United States Patent [19]
Braun

[11] Patent Number: 5,133,431
[45] Date of Patent: Jul. 28, 1992

[54] BRAKE LINING WEAR INDICATING DEVICE

[75] Inventor: Clemens Braun, Altrip/Rh., Fed. Rep. of Germany

[73] Assignee: Perrot-Bremse GmbH, Mannheim, Fed. Rep. of Germany

[21] Appl. No.: 662,705

[22] Filed: Mar. 1, 1991

[30] Foreign Application Priority Data

Mar. 2, 1990 [DE] Fed. Rep. of Germany ....... 4006616

[51] Int. Cl.$^5$ ............................................. F16D 66/02
[52] U.S. Cl. ............................... 188/1.11; 188/250 B
[58] Field of Search ............. 188/1.11, 250 R, 250 B, 188/250 F, 250 G

[56] References Cited

U.S. PATENT DOCUMENTS

| | | | |
|---|---|---|---|
| 3,556,258 | 1/1971 | Winge | 188/1.11 |
| 3,976,167 | 8/1976 | Hirai et al. | 188/1.11 |
| 4,318,457 | 3/1982 | Dorsch et al. | 188/1.11 |
| 4,520,661 | 6/1985 | Tamai et al. | 188/1.11 X |
| 4,869,350 | 9/1989 | Fargier et al. | 188/1.11 |

FOREIGN PATENT DOCUMENTS 0304356 2/1989 European Pat. Off. .
3230266 2/1984 Fed. Rep. of Germany ..... 188/1.11

Primary Examiner—Matthew C. Graham
Assistant Examiner—Peter M. Poon
Attorney, Agent, or Firm—Fleit, Jacobson, Cohn, Price, Holman & Stern

[57] ABSTRACT

A brake lining wear indicating device is inserted into an aperture (7) of a brake lining carrier (8) of a drum or disc brake from the side facing away from the brake lining (1) and secured in the aperture. The indicating device includes a slotted (16) sleeve shaped holder (2) and a contact member (3) inserted into and axially secured to the holder and has an electrical conductor (4) therein. In order that the indicating device can be fitted into brake lining carriers of different thickness, holder (2) has on its side facing away from the brake lining (1) a frustonconical section (13) having an outwardly narrowing inner frustoconical area (14) and several axially extending slots (16). When contact member (3) is inserted into holder (2), frustoconical part (13) of the holder is forcibly radially expanded and wedged into aperture (7) of brake lining carrier (8).

11 Claims, 3 Drawing Sheets

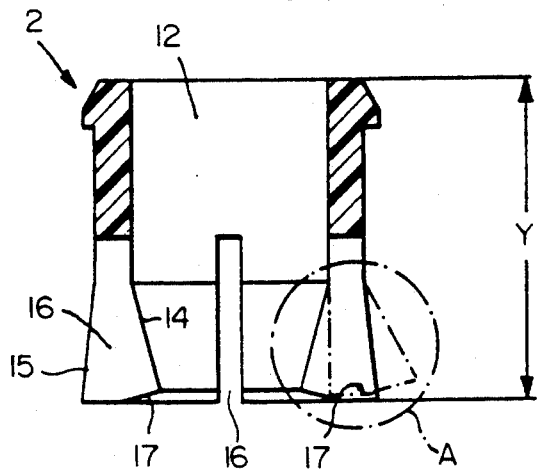
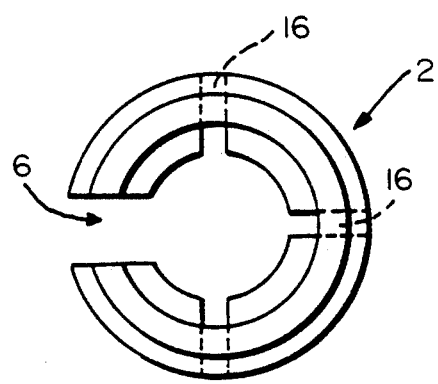
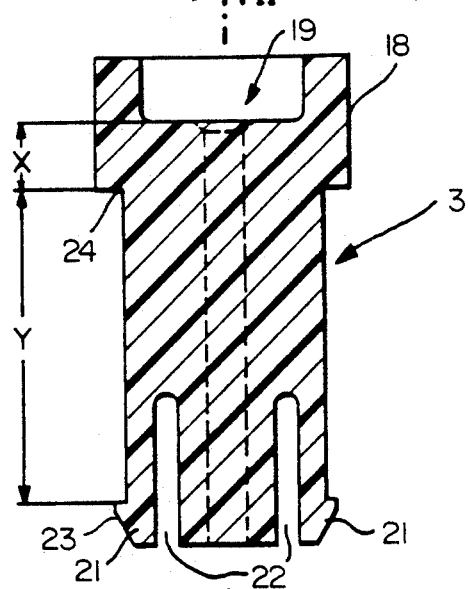
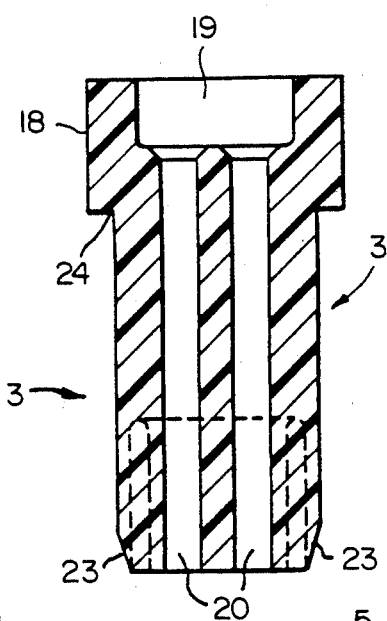
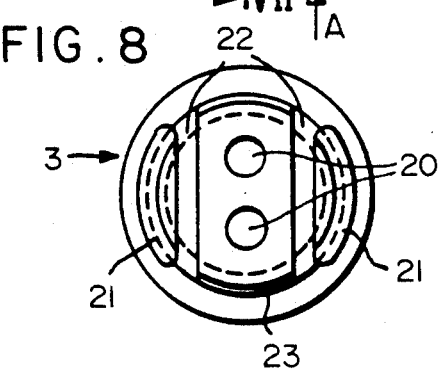
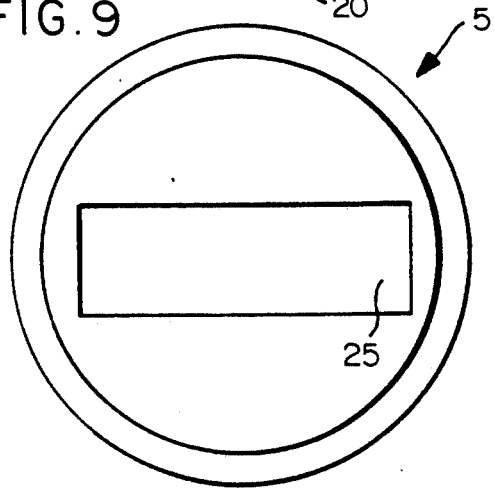

ial cross-sectional view through a brake lining wear indicating device of the invention in its assembled state;

BRAKE LINING WEAR INDICATING DEVICE

BACKGROUND OF THE INVENTION

The invention relates to a brake lining wear indicating device which is inserted into an aperture of the brake lining carrier of a drum or disc brake from the side which is facing away from the brake lining and secured in said opening.

Both drum and disc brakes have brake linings and/or brake lining carriers to accommodate linings of different thickness, depending on the lining material and type of brake. Accordingly, the individual parts for securing the assembly position of the known devices for indicating the reliable wear limit of the brake lining are different and numerous.

Consequently, conventional indicating devices have to be suited in their construction to the respective thicknesses of the brake linings and/or the lining carriers, thus necessitating a multiplicity of different individual components.

In an indicating device of the initially mentioned type, as described in European application No. EP 0 304 356 A1 (corresponding to U.S. Pat. No. 4,869,350), the holder is provided on both ends of the cylindrical area with an annular shoulder. The distance of the annular shoulders is matched to the thickness of the brake lining carrier. If this distance is too great, then the holder together with the inserted contact member could perform an axial movement relative to the brake lining carrier, which is undesirable. However, if the distance is too small, then the holder cannot be inserted into the aperture of the brake lining carrier at all.

BRIEF SUMMARY OF THE INVENTION

It is the object of the invention to provide an indicating device having a holder with standard dimensions and which can be inserted into and secured in brake lining carriers of different thickness.

The invention is in an indicating device having a holder, which is constructed to be a standard part and provided at its end remote from the brake lining with means for adjusting the holder in its assembled position to the thickness of the respective brake lining carrier, in order to self-lockingly clamp itself to the inserted contact member in the aperture of the brake lining carrier.

More specifically, the invention comprises a slotted sleeve-like holder of a deformable material including a cylindrical area corresponding to the diameter of the aperture arranged in the brake lining carrier, having two ends which protrude in their built-in state over the brake lining carrier and reach behind it, a contact member including an area corresponding to the inside diameter of the holder, and an electrical conductor which makes contact with the rotating part of the brake in the event of excessive brake lining wear. The contact member can be spaced during its assembly from the brake lining relative to the holder, which is inserted into the opening, until raster means at the contact member and at the holder engage, preventing relative axial displacement.

BRIEF DESCRIPTION OF THE DRAWINGS

A preferred exemplary embodiment of the invention will now be described in detail with reference to the accompanying drawings wherein:

FIG. 4 is a cross-sectional view taken along line IV—IV in FIG. 3;

FIG. 5 is a top plan view of the holder of FIG. 3;

FIG. 6 is an axial cross-sectional view through a contact member of the indicating device of the invention;

FIG. 7 is a cross-sectional view taken along line VII—VII in FIG. 6;

FIG. 8 is a bottom plan view of the contact member of FIG. 6;

FIG. 9 is an enlarged bottom plan view of the seal inserted into the contact member and FIG. 10 is a left side elevational view of FIG. 3.

DETAILED DESCRIPTION

Figure 1:
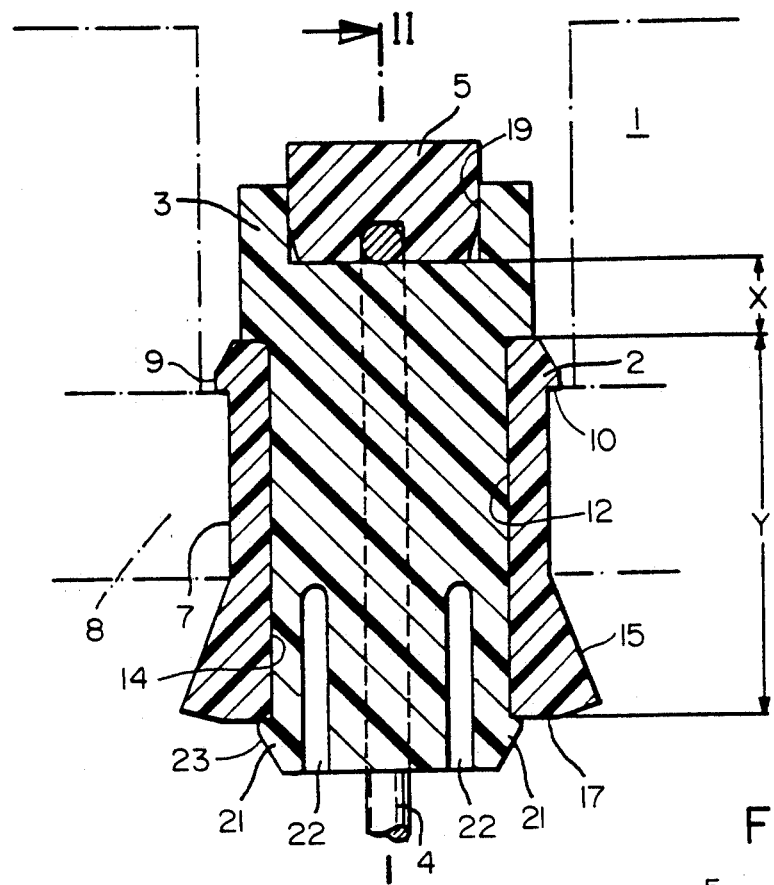
FIG. 1 is an axial cross-sectional view through a brake lining wear indicating device of the invention in its assembled state.
Figure 2:
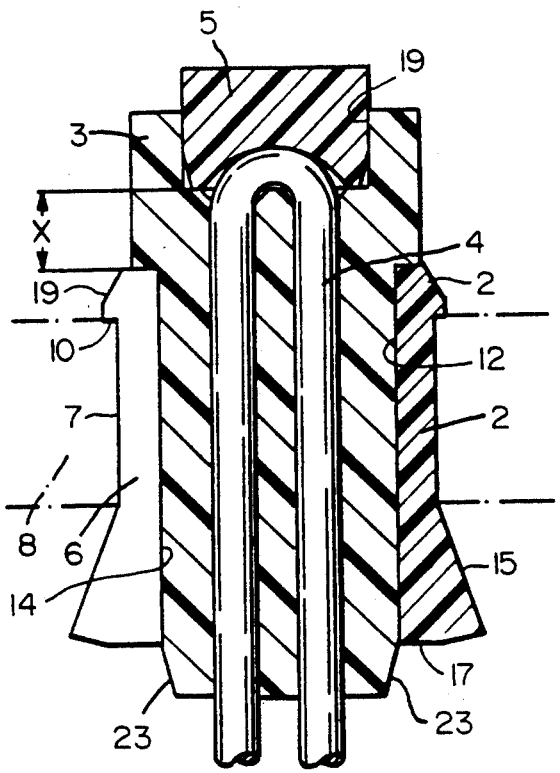
FIG. 2. is a cross-sectional view taken along line II—II in FIG. 1.
Figure 10:
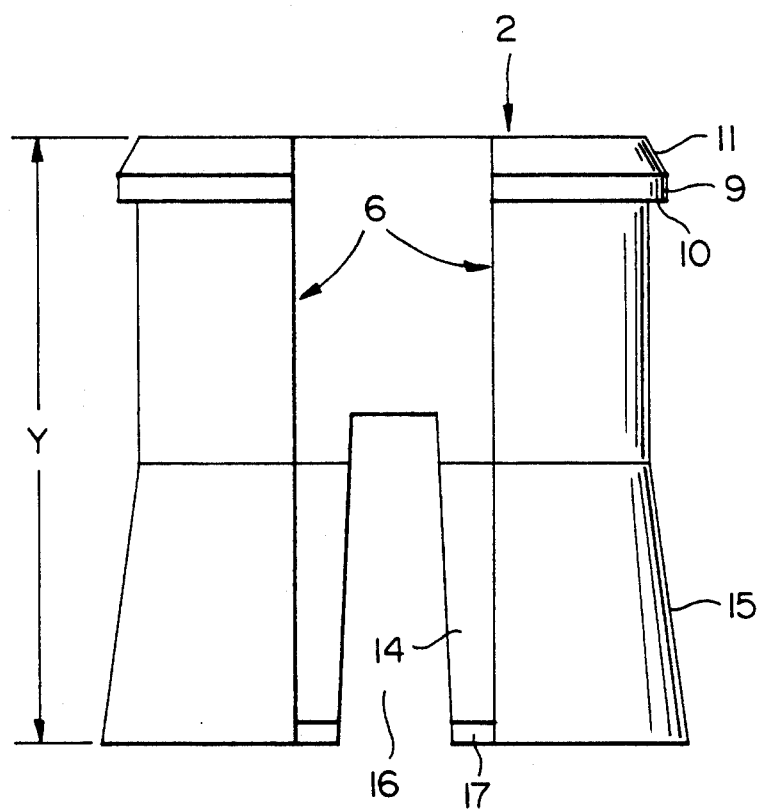

The brake lining wear indicating device as shown in FIGS. 1 and 2 consists of a sleeve-shaped holder 2 and a contact member 3, which already accommodates an electrical conductor 4 and a seal 5 in its pre-assembly state.

The holder 2 comprises a slot 6, which extends over its entire length and facilitates the insertion and clamping of holder 2 in an aperture 7 of a brake lining carrier 8, indicated by means of broken lines. At its end facing the brake lining 1, which is indicated by broken lines, holder 2 has a radially outward extending collar 9. The shoulder 10, as formed by said collar 9, serves as an abutment against the brake lining carrier 8, and a frontal slant 11 of shoulder 10 serves to ease the insertion of holder 2 into aperture 7.

Figure 3:
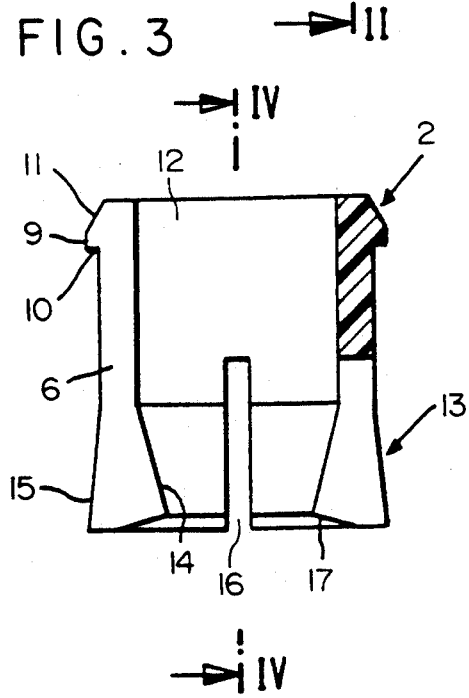
FIG. 3 is an axial cross-sectional view through a holder of the indicating device in its initial state.

As can be seen in FIGS. 3, 4 and 5, holder 2 comprises a through passage 12, which extends in part cylindrically over the length of the holder and serves to accommodate contact member 3. Adjacent to the cylindrical part of holder 2 is a two-sided frustoconical section 13 which extends up to the end of the holder. The inner frustoconical area 14 has a larger conical angle than the outer frustoconical area 15. Thereby, the two frustoconical areas 14, 15 can extend at different lengths up to the cylindrical part of holder 2.

From the side of frustoconical section 13, several axial slots 16, which are spaced around the periphery of holder 2, extend up to the cylindrical area. These axial slots 16 serve to guarantee even abutment of holder 2 relative to the aperture 7 and the thickness of brake lining carrier 8. The end surface of the conical section 13 has an inwardly slanted or frustoconical surface 17, in the position shown in FIGS. 3 and 4, the purpose of which can be seen in the following description.

The cylindrical area of holder 2, extending from shoulder 10 to the beginning of conical area 15, corresponds to the maximum thickness of the usable brake lining carrier 8.

Contact member 3 has a cylindrical form with a radial collar 18 having a receiving aperture 19 for seal 5 in its head section. Contact member 3 is provided with two axial through bores 20, serving to receive the electrical conductor. At the foot end of contact member 3 are at least two oppositely placed hook-shaped portions 21, axial slots 22 and slanting or frustoconical areas 23.

In the assembled state, shoulder 24, formed by radial collar 18 of contact member 3, abuts against the end surface of holder 2, and the hook-shaped areas 21 extend over and behind the foot end of holder 2. Thereby, the constant length Y of contact member 3 corresponds with the constant length Y of holder 2. Only the variable area X of contact member 3 is in its length dependent on the wear-limit of brake lining 1.

It is thus possible to use the indicating device for brake-lining carriers 8 of different thicknesses, and with only one variably arranged area X for brake linings 1 of different thickness.

The cylindrical seal 5 has a recess 25. Seal 5 is welded or glued into the receiving aperture 19 of contact member 3, and recess 25 receives and positions the electrical conductor 4. The complete assembly of contact member 3 including the electrical conductor 4 and seal 5 takes place prior to fitting the indicator device into brake-lining carrier 8.

All parts of the indicating device, with the exception of the electrical conductor 4, are made of synthetic material.

The assembly of the aforedescribed indicating device is carried out as follows:

First of all, contact member 3 is pushed through aperture 7 of brake lining carrier 8 from the side facing away from the brake lining 1. Then, holder 2 with its slot 6 is laterally pushed over the electrical conductor 4 and then pressed from said side into aperture 7 until its collar 9 extends over and behind brake lining carrier 8.

Next, contact member 3 is pushed in the opposite axial direction, i.e. away from brake lining 1, into the passage 12 of the thus positioned holder 2. After having passed the cylindrical section of holder 2, contact member 3 will press against the narrowed inner conical area 14 in order to finally force it radially outwards. Thereby, outer conical area 15 is radially outwardly expanded (see section A in FIG. 4), so that holder 2 is clamped behind brake lining carrier 8. In this way, holder 2 adjusts to the thickness of the respective brake lining carrier.

When contact member 3 is fully inserted into holder 2, its hooked portions 21 extend over and behind the foot end of holder 2 at surface 17. In this way, holder 2 and contact member 3 as a complete indicating device are both axially and radially secured in opening 7 of the brake lining carrier 8.

The maximum wear-limit is indicated when brake lining 1 and seal 5 are worn to such an extent that the electrical conductor 4 makes contact with the rotating brake member and is cut by it. The indicating device is replaced when the necessary replacement of the brake lining is carried out.

Although the exemplary embodiment as shown in the drawing and described above is a preferred form of the embodiment of the invention, it only serves to explain the invention, permitting numerous variations within the framework of general subject knowledge without departing from the basic idea of the invention.

I claim:

1. In a brake lining wear indicating device insertable into an aperture of a brake lining carrier having a brake lining thereon, the indicating device including a slotted sleeve-shaped holder of deformable material having an inner surface and a cylindrical outer surface area corresponding to the dimensions of said aperture in said brake lining carrier, a first end on said holder adjacent said brake lining when said holder is installed in said carrier, a second opposite end on said holder, said ends on said holder protruding, when installed for use, beyond the ends of said aperture in said brake lining carrier and engaging said carrier to retain said holder therein, a cylindrical contact member inserted into said holder in an assembled position and having an outer surface thereon corresponding substantially to at least part of said inner surface of said holder, an electrical conductor in said contact member which contacts a rotating part of the brake engaging the brake lining in use in the event of excessive brake lining wear, and retaining elements on said contact member engaging said holder for preventing relative axial displacement therebetween, the improvement comprising:

a frustoconical element on said holder extending substantially from said outer cylindrical surface area in the direction toward said second end of said holder;

an inner frustoconical surface on said frustoconical element adjacent said second end of said holder forming a portion of said inner surface of said holder and decreasing radially inwardly in the direction of said second end of said holder;

a plurality of axially extending slots in said frustoconical element;

an enlarged first end portion on said contact member adjacent said first end of said holder;

a shoulder on said enlarged end portion abutting said first end of said holder;

a second end portion on said contact member protruding through said second end of said holder; and a plurality of hook shaped elements on said second end portion of said contact member engaging said second end of said holder for retaining said contact member in said holder, said hooked shaped elements being spaced from said shoulder a distance substantially corresponding to the distance between said first and second ends of said holder;

so that when said holder is installed in said aperture and said contact member is inserted into said holder in the direction away from the brake lining, said outer surface of said contact member engages said inner frustoconical surface and displaces said frustoconical element radially outwardly for retaining engagement with said carrier.

2. A brake lining wear indicating device as claimed in claim 1 and further comprising:
   an outer frustoconical surface on said frustoconical element engaging said carrier when in the installed position.

3. A brake lining wear indicating device as claimed in claim 1 and further comprising:
   an end surface portion on said second end of said holder having a frustoconical shape decreasing radially inwardly in the direction toward said first end of said holder.

4. A brake lining wear indicating device as claimed in claim 1 and further comprising:
   axial slots in said second end portion of said contact member for facilitating radially inward displacement of said hook shaped elements during said insertion of said contact member into said holder.

5. A brake lining wear indicating device as claimed in claim 4 and further comprising:
   a plurality of inclined surfaces on said second end portion of said contact member directed radially inwardly toward the end of said second end portion.

6. A brake lining wear indicating device as claimed in claim 5 and further comprising:
   at least one axial bore in said contact member for receiving said electrical conductor therein.

7. A brake lining wear indicating device as claimed in claim 6 and further comprising:
   a recessed opening in said first end portion of said contact member having a bottom through which said at least one axial bore extends, said bottom being axially spaced from said shoulder a distance determining the permissible wear of the brake lining.

8. A brake lining wear indicating device as claimed in claim 1 and further comprising:
   at least one axial bore in said contact member for receiving said electrical conductor therein.

9. A brake lining wear indicating device as claimed in claim 8 and further comprising:
   a recessed opening in said first end portion of said contact member having a bottom through which said at least one axial bore extends, said bottom being axially spaced from said shoulder a distance determining the permissible wear of the brake lining.

10. A brake lining wear indicating device as claimed in claim 9 and further comprising:
    a seal member inserted into said recessed opening.

11. A brake lining wear indicating device as claimed in claim 10 and further comprising:
    a slot in said seal member adjacent said bottom of said recessed opening for receiving a part of said electrical conductor.

* * * * *